(12) United States Patent
Nagaoka et al.

(10) Patent No.: US 6,287,019 B1
(45) Date of Patent: Sep. 11, 2001

(54) OPTICAL CONNECTOR

(75) Inventors: Yasutaka Nagaoka; Nobuhiko Suzuki; Hiroyuki Kondo; Norihito Suzuki, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/338,923

(22) Filed: Jun. 23, 1999

(30) Foreign Application Priority Data

Jun. 23, 1998 (JP) .............................................. P 10-176287

(51) Int. Cl.⁷ ....................................................... G02B 6/36
(52) U.S. Cl. ................................................. 385/78; 385/76
(58) Field of Search ................................ 350/96.2–96.22; 385/55, 58, 60, 72, 75, 77, 78, 80, 81, 88, 89, 90–94, 76, 53

(56) References Cited

U.S. PATENT DOCUMENTS

| 4,804,243 | 2/1989 | Borsuk et al. | 350/96.2 |
| 4,844,570 | 7/1989 | Tanabe | 350/96.2 |
| 5,313,540 | 5/1994 | Ueda et al. | 385/78 |

FOREIGN PATENT DOCUMENTS

| 0 571 325 | 11/1993 | (EP) | G02B/6/38 |
| 0 819 960 | 1/1998 | (EP) | G02B/6/38 |
| 61-112107 | 5/1986 | (JP) | G02B/6/38 |
| 63-73706 | 5/1988 | (JP) | G02B/6/38 |
| 63-199207 | 12/1988 | (JP) | G02B/6/38 |

*Primary Examiner*—Frank G. Font
*Assistant Examiner*—Michael P. Mooney
(74) *Attorney, Agent, or Firm*—Sughrue, Mion, Zinn, Macpeak & Seas, PLLC (57) ABSTRACT

An optical connector 1 includes an optical connector plug 2, a connector housing 123, and a ferrule holder 122, and an urging member 3, having resilient, contractible legs 3b, is formed integrally on a ferrule 4 of the optical connector plug 2. The connector housing 123 has a receiving chamber 139 for receiving the ferrule 4, and is adapted to be fitted in a housing 124a of a mating connector 124. The ferrule holder 122 receives the optical connector plug 2, and is fitted on the connector housing 123, and the legs 3b abut against the ferrule holder 122 to maintain an urged condition of the optical connector plug 2 within the receiving chamber 139.

6 Claims, 9 Drawing Sheets

OPTICAL CONNECTOR

BACKGROUND OF INVENTION

1. Field of Invention

This invention relates to an optical connector, and more particularly to an optical connector in which the efficiency of assembling of an optical connector plug is enhanced.

2. Related Art

Figure 11:
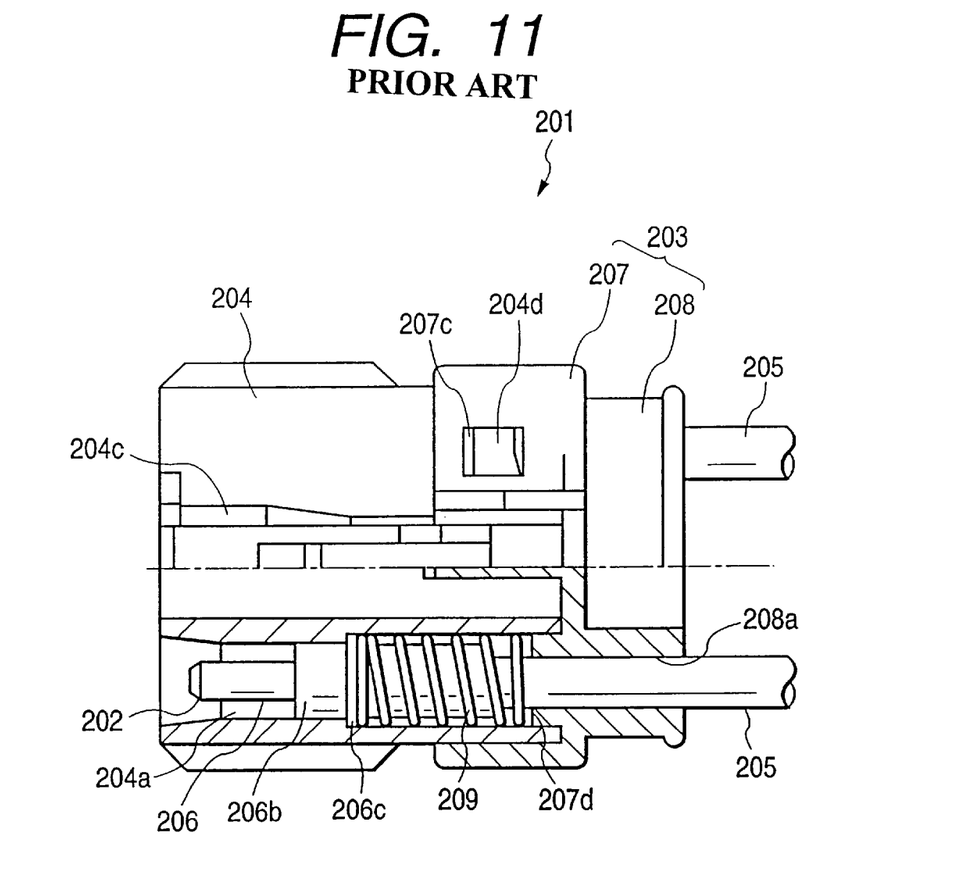
FIG 11 is an exploded, perspective view of a conventional optical connector.

FIG. 11 shows one known conventional optical connector.

In this Figure, the optical connector 201 comprises optical connector plugs 202, a ferrule holder 203, and a connector housing 204.

Each of the optical connector plugs 202 includes photoconductive member 205 (e.g. optical fiber), and a cylindrical ferrule 206 having a smaller-diameter portion 206a and a larger-diameter portion 206b. A conductor portion (not shown) of each of the photoconductive members 205 is received in the smaller-diameter portion 206a, and a sheath 205a thereof is received in the larger-diameter portion 206b.

The ferrule holder 203 includes a box-like housing 207, having a front end surface part of which is open for the optical connector plugs 202, and a support wall 208 of an oval cross-section formed integrally on a rear end surface of the housing 207. A recess 207b is formed in a central portion of an upper wall 207a of the housing 207, and rectangular retaining holes 207c are formed in this upper wall 207a, and are disposed respectively on opposite sides of the recess 207b. Insertion holes 208a for respectively passing the pair of photoconductive members 205 therethrough are formed through the support wall 208.

The connector housing 204 includes hollow plug-receiving chambers 204a for respectively receiving the optical connector plugs 202, and a lock arm 204c for engagement with a housing of a mating connector (not shown) is formed on a front end portion of an upper wall 204b of this connector housing, and retaining projections 204d, corresponding respectively to the retaining holes 207c, are formed on a rear end portion of the upper wall 204b.

A recess 204e is formed in a central portion of the upper wall 204b, and a guide portion 4f for the ferrule holder 203 is formed in communication with the recess 204e.

Figure 12:
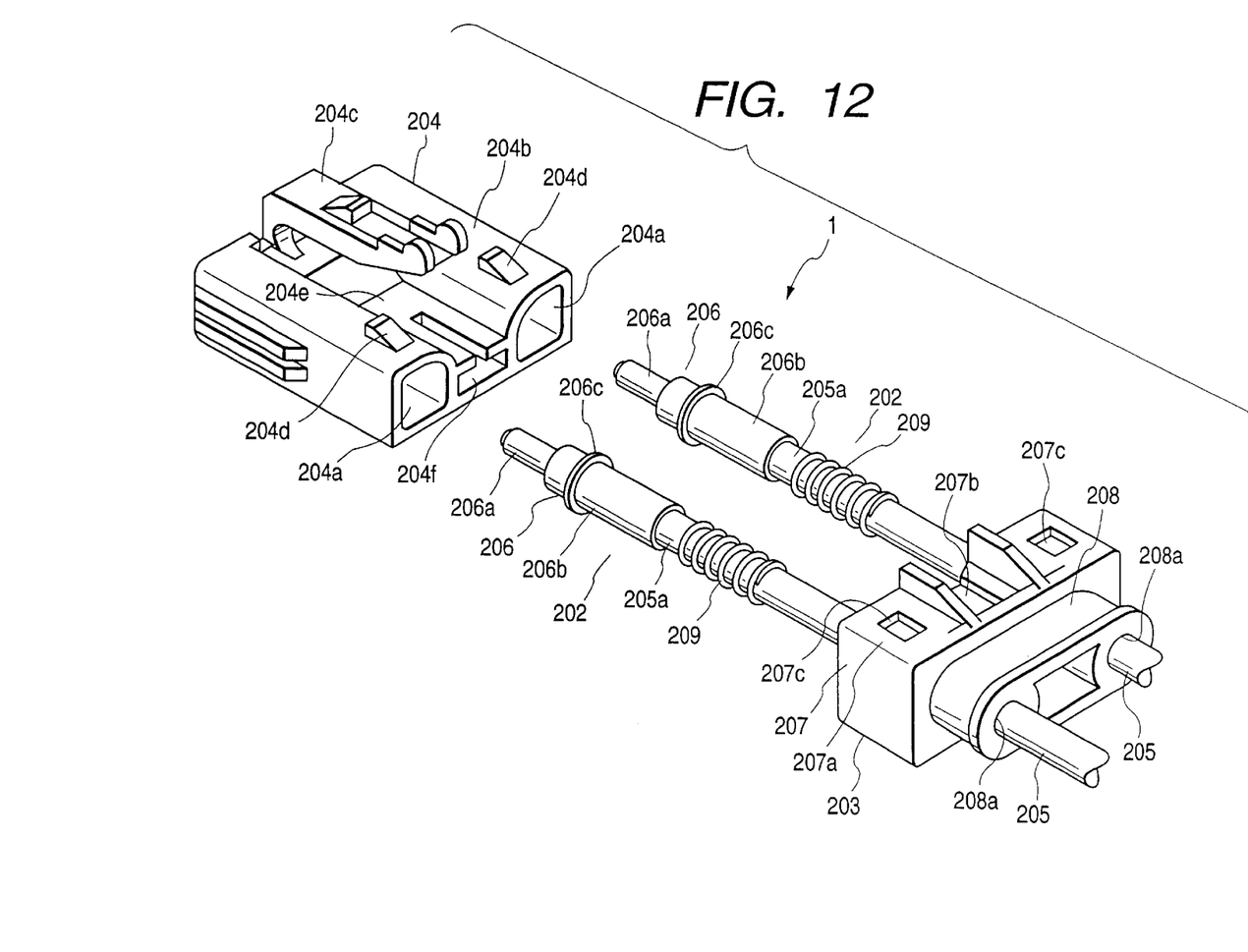
FIG. 12 is a cross-sectional view showing a connector housing and a ferrule holder of FIG. 7 fitted together.

In the above construction, before forming each of the optical connector plugs 202, the photoconductive member 205 is first passed through the ferrule holder 203, and then a compression coil spring (resilient member) 209 is mounted on the photoconductive member 205. As the ferrule holder 203 is connected, together with the optical connector plugs 202, to the connector housing 204, the ferrule holder 203 is guided by the guide portion 204f, and shown in FIG. 12, the retaining projections 204d (only one of which is shown in FIG. 12) on the connector housing 204 are firmly engaged respectively in the retaining holes 207c (only one of which is shown in FIG. 12) in the ferrule holder 203, thereby forming the optical connector 201 which is now ready for connection to the housing of the mating connector (not shown).

In this condition, each optical connector plug 202 has a slight play because of the resilient force of the compression coil spring 209 acting between an engagement projection 206c, formed on the outer surface of the larger-diameter portion 206b of the ferrule 206 over an entire periphery thereof, and an engagement portion 207d formed within the housing 207.

In the above prior art, before forming the optical connector plugs 202, the photoconductive members 205 must be passed through the ferrule holder 203, and therefore there has been encountered a problem that the efficiency of the operation can not be enhanced because of this cumbersome operation.

And besides, the ferrule holder 203 and the connector housing 204 are firmly engaged with each other, and therefore for example, even when it becomes necessary to effect the maintenance of the optical connector 201 or to exchange the connector housing 204, the engagement between the ferrule holder 203 and the connector housing 204 can not be easily canceled, and in some cases there is a possibility that this leads to damage to these parts.

Furthermore, since the optical connector plug 202 is formed at the end portion of the photoconductive member 205, the photoconductive member 205 can not be removed from the ferrule holder 203, which leads to a problem that the optical connector 201 can not have extensibility.

SUMMARY OF INVENTION

With the above problems in view, it is an object of this invention to provide an optical connector in which an assembling operation is easy, and the efficiency of the operation is markedly enhanced, and measures are taken against assembling errors.

An optical connector of the present invention, which has been made in order to solve the above problems, comprises an optical connector plug comprising a photoconductive member, and a ferrule receiving and retaining an end portion of the photoconductive member therein, wherein an urging member, having resilient, contractible legs, is formed integrally on the ferrule; a connector housing for fitting connection to a housing of a mating connector, the connector housing having a receiving chamber for receiving the ferrule; and a ferrule holder which receives the optical connector plug, and is fitted on the connector housing, the legs abutting against the ferrule holder to maintain an urged condition of the optical connector plug within the receiving chamber.

In the above construction, the optical connector includes the optical connector plug, the connector housing, and the ferrule holder, and the urging member, having the resilient, contractible legs, is formed integrally on the ferrule of the optical connector plug. The connector housing has the receiving chamber for receiving the ferrule, and is adapted to be fitted in the housing of the mating connector. The ferrule holder receives the optical connector plug, and is fitted on the connector housing, and the legs abut against the ferrule holder to maintain an urged condition of the optical connector plug within the receiving chamber.

With this construction of the optical connector, the use of the compression coil spring in the conventional optical connector can be omitted, and therefore an error in the mounting of this compression coil spring will not occur. And, naturally, there is no need to confirm the mounting of the compression coil spring. And besides, the process of assembling the optical connector plug is simplified, and therefore the assembling operation is easy, and the efficiency of the operation is enhanced. Furthermore, the photoconductive member can be inserted into the ferrule while firmly holding the photoconductive member with the hand.

Therefore, there can be provided the optical connector in which the assembling operation is easy, and the efficiency of the operation is markedly enhanced, and the measures are taken against assembling errors.

In the optical connector of the present invention, each of the legs is in the form of a leaf spring slanting and increasing in height progressively in a direction of a periphery of the ferrule.

In the above construction, each of the legs is in the form of a leaf spring slanting and increasing in height progressively in the direction of the periphery of the ferrule.

Therefore, the legs, though simple in construction, can provide a sufficient urging force generally equal to that of the conventional compression coil spring.

In the optical connector of the present invention, each of the legs is in the form of a wavy bar having a plurality of bent portions, and apexes of the bent portions face alternately in generally opposite directions.

In the above construction, each of the legs is in the form of a wavy bar having the plurality of bent portions, and the apexes of the bent portions face alternately in generally opposite directions.

In this case, also, the legs, though simple in construction, can provide a sufficient urging force generally equal to that of the conventional compression coil spring.

In the optical connector of the present invention, the urging member is formed at an end of the ferrule.

In the above construction, the urging member is formed at the end of the ferrule.

When the urging member is disposed at the above-mentioned position, the end portion of the ferrule is disposed outside the range of expansion and contraction of the legs, and even if an adhesive is squeezed out when the photoconductive member is inserted into the ferrule, no correcting operation is needed in so far as the amount of this squeezed-out adhesive is unduly large.

Therefore, this further reduces the time and labor required for the operation, and the efficiency of the operation can be further enhanced.

DETAILED DESCRIPTION OF PREFERRED EMBODIMENTS

Figure 4:
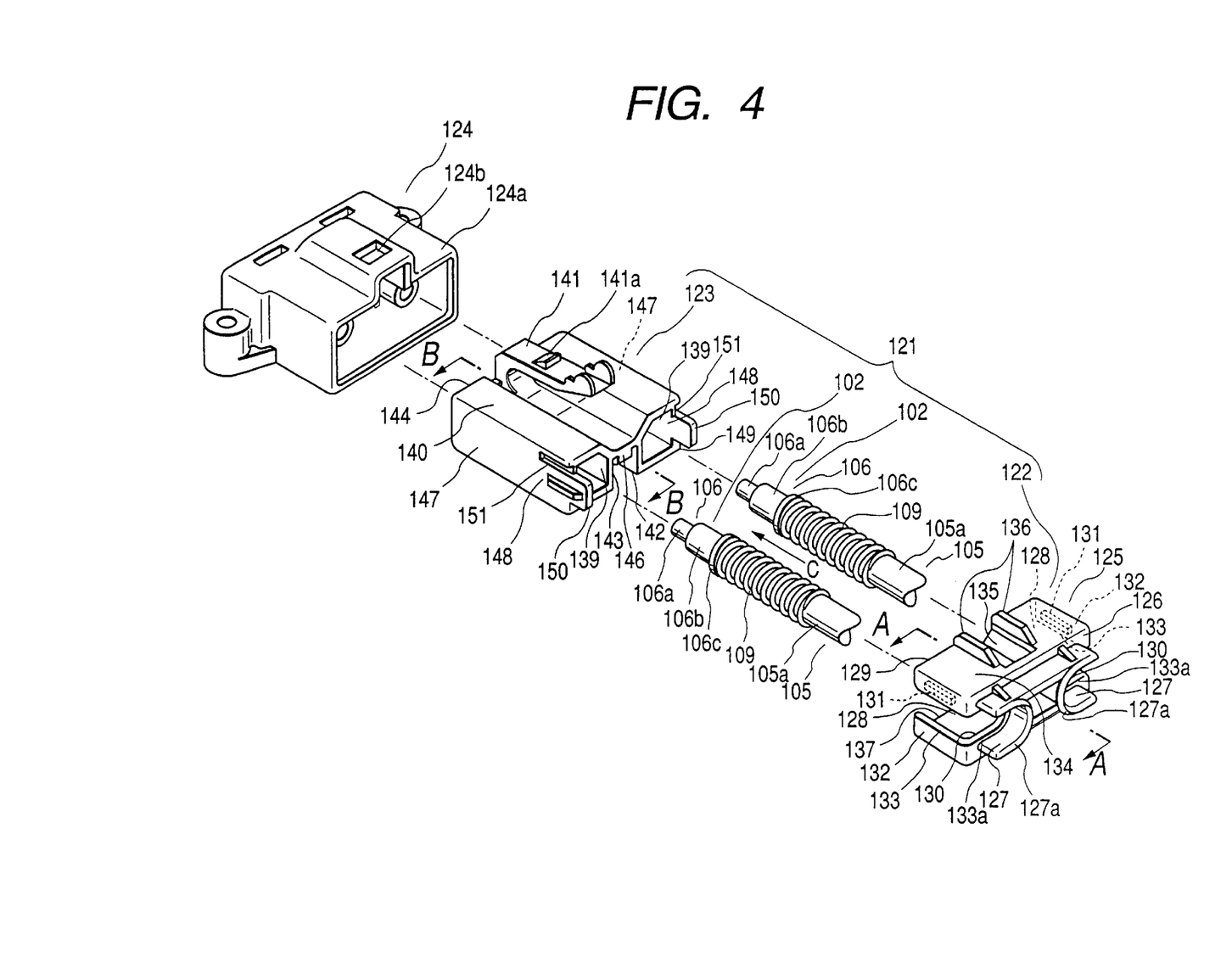
FIG. 4 is an exploded, perspective view of an optical connector.

FIG. 4 shows an optical connector earlier proposed by the Applicant of the present application. This optical connector 121 comprises a pair of optical connector plugs 102 and 102, a ferrule holder 122, and a connector housing 123, and this optical connector is adapted to be fitted in a mating connector 124.

Figure 10:
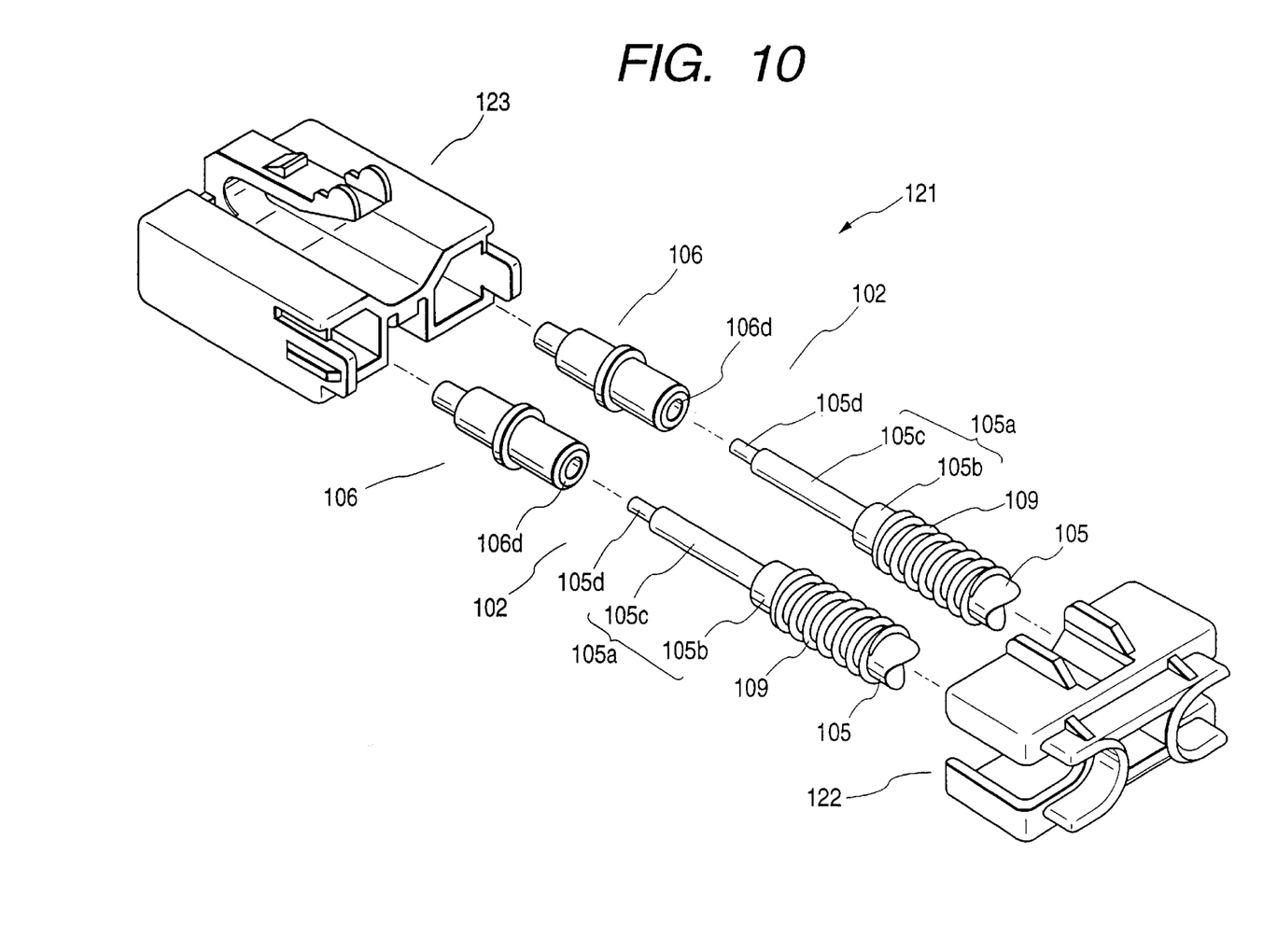
FIG. 10 is an exploded, perspective view showing the optical connector and the optical plugs in FIG. 4.

Each of the optical connector plugs 102 and 102 comprises a photoconductive member (optical fiber) 105, and a cylindrical ferrule 106 of a synthetic resin having a smaller-diameter portion 106a and a larger-diameter portion 106b, and a compression coil spring (resilient member) 109. Ends (see FIG. 10) of the photoconductive members 105 and 105 are inserted into the ferrules 106 and 106.

An engagement projection 106c for retaining the compression coil spring 109 is formed on the larger-diameter portion 106b.

The ferrule holder 122 includes a housing 125, made of a synthetic resin, and support walls 127 and 127 formed integrally on a rear wall 126 of the housing 125. Plug receiving chambers 128 and 128 for respectively receiving the optical connector plugs 102 and 102 are formed in the housing 125, and are open to a front end surface 129 of this housing 125.

An engagement portion 130 for retaining the compression coil spring 109, as well as an elongate guide projection 131 for enabling the smooth fitting operation, is formed at the plug receiving chamber 128.

Plug-introducing slits 133 and 133, communicating respectively with the plug receiving chambers 128 and 128, are formed respectively through opposite side walls 132 and 132 of the housing 125 and also through part of the rear wall 126.

Figure 5:
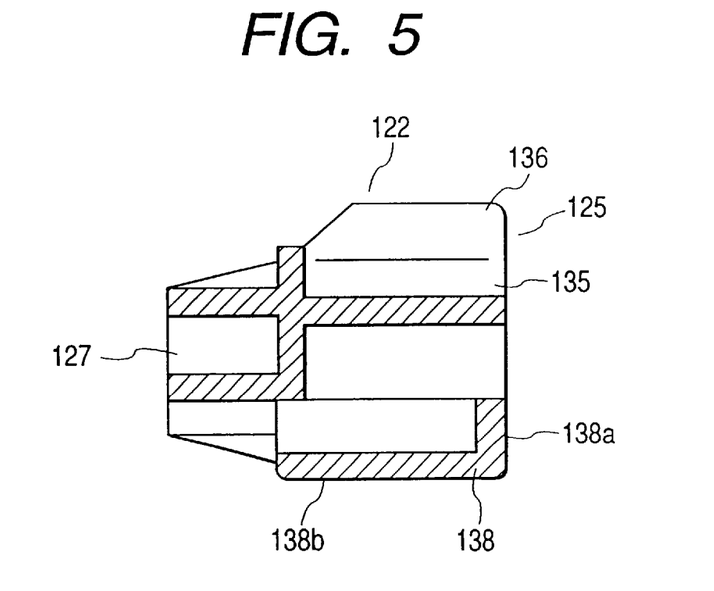
FIG. 5 is a cross-sectional view of a ferrule taken along the line A—A of FIG. 4.

A recess 135 is formed in a central portion of an upper wall 134 of the housing 125, and protection walls 136 and 136 for a lock arm 141 (described later) of the connector housing 123 engageable with the mating connector 124 are formed on the upper wall 134 of the housing 125, and are disposed respectively on opposite sides of the recess 135. A retaining portion 138 (see FIG. 5), having an L-shaped cross-section in the direction of the axis of the ferrule holder 122, is formed at a central portion of a lower wall 137 of the housing 125, and an elastic retaining piece portion 146 (described later) of the connector housing 123 is engaged with one wall 138a of the retaining portion 138 disposed perpendicular to the axis of the ferrule holder 122, and the other wall 138b (see FIG. 5) serves to protect this engaged portion.

The support walls 127 and 127 have a C-shaped cross-section in a direction perpendicular to the axis of the ferrule holder 122, and project beyond edge portions 133a and 133a of the plug-introducing slits 133 and 133 formed at the rear wall 126, and end portions 127a and 127a of these support walls 127 and 127 are curved.

Figure 6:
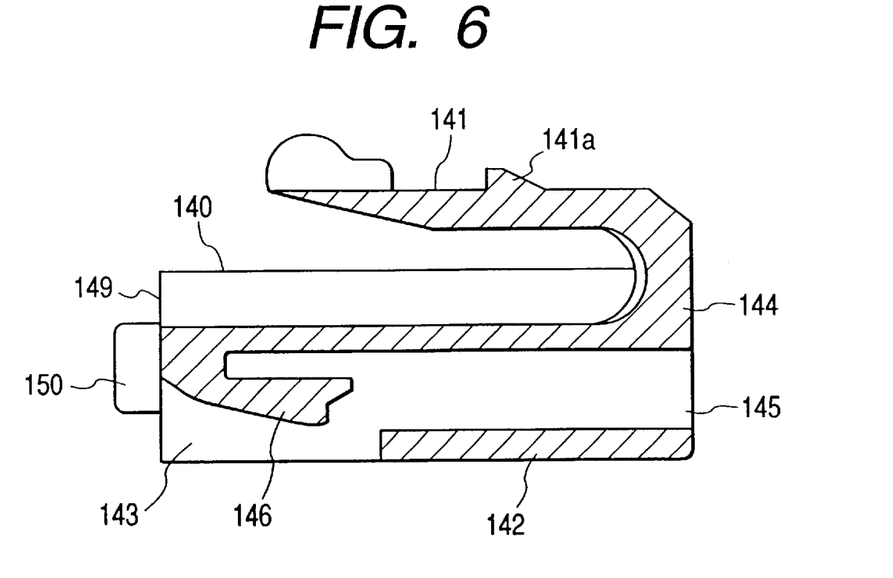
FIG. 6 is a cross-sectional view of a connector housing taken along the line B—B of FIG. 4.

The connector housing 123 is molded of a synthetic resin, and has hollow plug-receiving chambers 139 and 139 for respectively receiving the optical connector plugs 102 and 102. The lock arm 141 for engagement with a housing 124a of the mating connector 124 is formed on a front end portion of an upper wall 140 of the connector housing 123. A recess 143 is formed in a central portion of a lower wall 142, and separates the plug receiving chambers 139 and 139 from each other. A retention cancellation jig-inserting hole 145 (see FIG. 6) is formed in the connector housing 123, and extends from a front end surface 144, and communicates with the recess 143. The elastic retaining piece portion 146 (see FIG. 6) for engagement with the retaining portion 138 of the ferrule holder 122 is formed at the recessed portion 143.

Slit cover portions 148 and 148, corresponding respectively to the plug-introducing slits 133 and 133 formed respectively through the opposite side walls 132 and 132 of the ferrule holder 122, are formed respectively at opposite side walls 147 and 147 of the connector housing 123. Support wall cover portions 150 and 150 of a rectangular shape, corresponding respectively to the support walls 127 and 127 of the ferrule holder 122, are formed on and extend respectively from the slit cover portions 148 and 148, and project beyond the rear end surface 149 of the connector housing 123. Guide grooves 151 and 151 for respectively receiving the elongate guide projections 131 and 131 of the ferrule holder 122 are formed respectively in the slit cover portions 148 and 148.

The assembling of the optical connector 121 of the above construction will now be described with reference to FIG. 4.

First, the compression coil springs 109 and 109 are fitted respectively on the photoconductive members 105 and 105, and then the ferrules 106 and 106 are fitted respectively on the end portions of the photoconductive members 105 and 105, and are fixed thereto by an adhesive, thereby forming the optical connector plugs 102 and 102.

Figure 8:
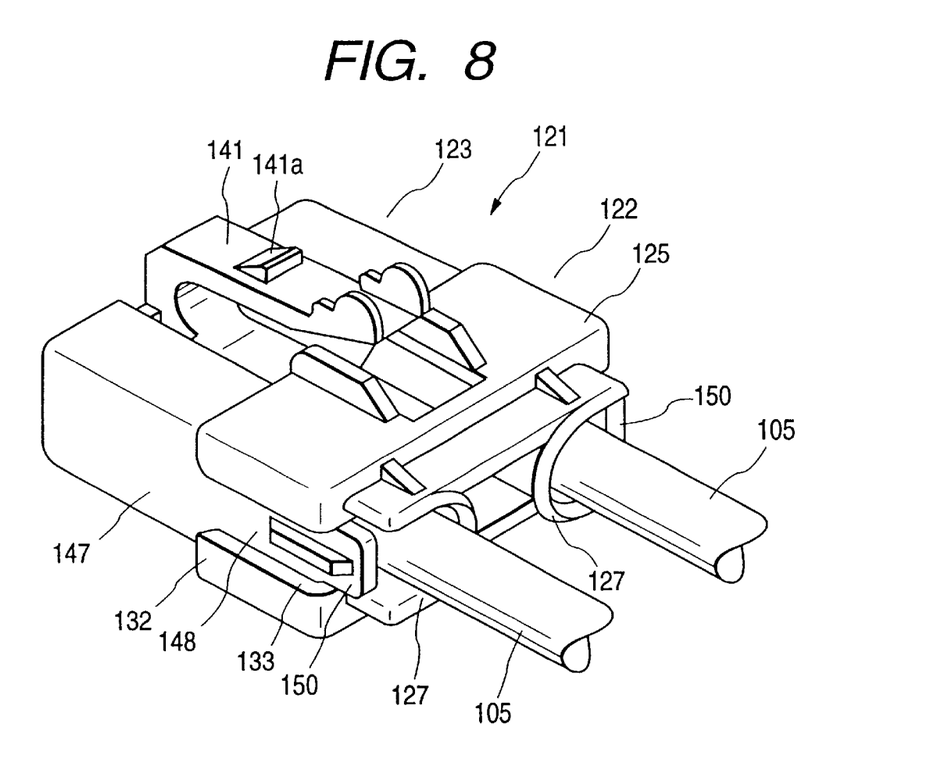
FIG. 8 is a perspective view showing the appearance in the fitted condition in FIG. 7.

Then, the optical connector plugs 102 and 102 are introduced respectively into the plug receiving chambers 128 and 128 of the ferrule holder 122 through the plug-introducing slits 133 and 133, and as the ferrule holder 122 is fitted on the connector housing 123 (in a direction of arrow C), the elongate guide projections 131 and 131 are brought into sliding engagement with the guide grooves 151 and 151, respectively, and then the elastic retaining piece portion 146 is brought into engagement with the one wall 138a of the retaining portion 138, as shown in FIG. 8, so that the connector housing 123 and the ferrule holder 122 are fitted together.

As this time, each of the optical connector plugs 102 and 102, inserted in the associated plug receiving chamber 139 of the connector housing 123, has a play (this condition is not shown in the drawings. Instead, see FIG. 4) because of the resilient force of the compression coil spring 109 acting between the engagement projection 106c of the ferrule 106 and the engagement portion 130 of the ferrule holder 122.

Those portions of the plug-introducing slits 133 and 133, formed respectively through the opposite side walls 132 and 132 of the ferrule holder 122, are covered respectively with the slit cover portions 148 and 148, and also the support walls 127 and 127 are covered respectively with the support wall cover portions 150 and 150 projecting respectively from the plug-introducing slits 133 and 133, thereby preventing the disengagement of the optical connector plugs 102 and 102.

Figure 9:
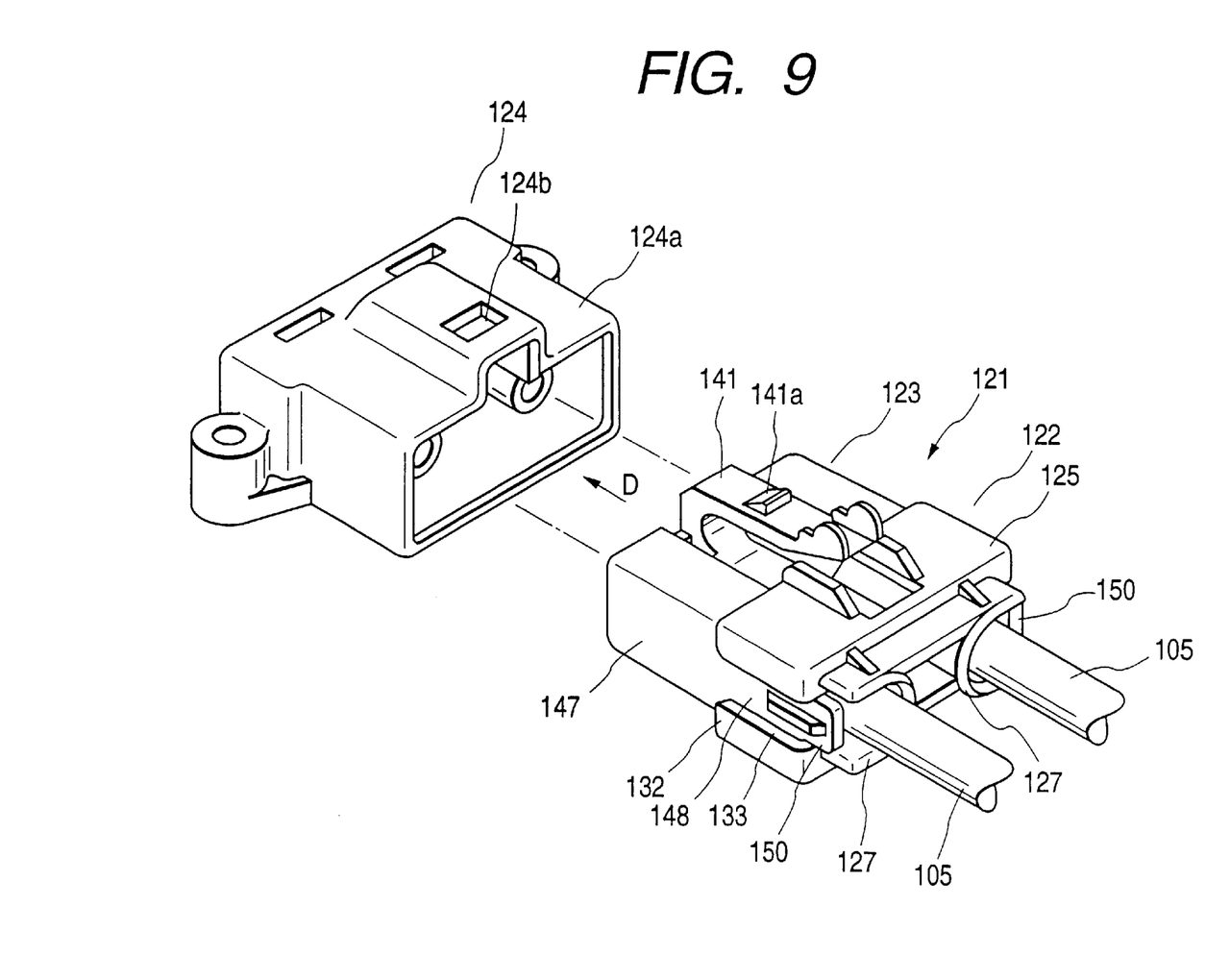
FIG. 9 is a perspective view explanatory of the fitting connection between the optical connector of FIG. 4 and a mating connector.

The thus assembled optical connector 121, shown in FIG. 8, can be connected to the housing 124a of the mating connector 124 (see FIG. 4). When the optical connector 121 is moved in a direction of arrow D to be fitted into the mating connector as shown in FIG. 9, a retaining projection 141a, formed on the lock arm 141, is engaged in a retaining hole 124b formed in the housing 124a, so that the optical connector 121 is connected to the mating connector 124.

In the above technique, the optical connector 121 is formed into the construction shown in FIG. 4, and with this construction, the assembling operation is much easier as compared with those optical connectors proposed before the above conventional technique, and therefore there is achieved an advantage that the efficiency of the operation is greatly enhanced. And besides, the maintenance ability can be enhanced, and the extensibility can be obtained.

Embodiment

Figure 1:
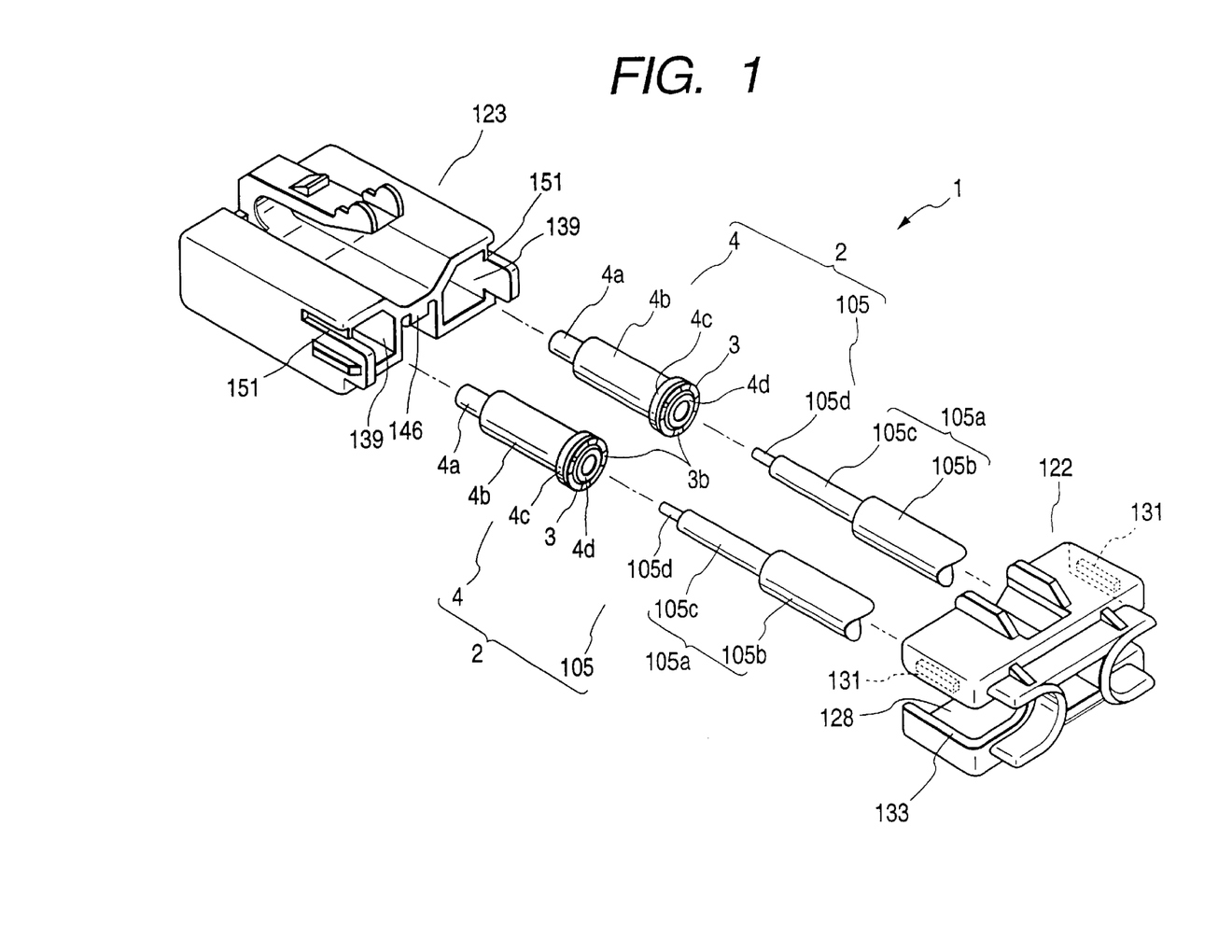
FIG. 1 is an exploded, perspective view showing one preferred embodiment of an optical connector of the invention.
Figure 2:
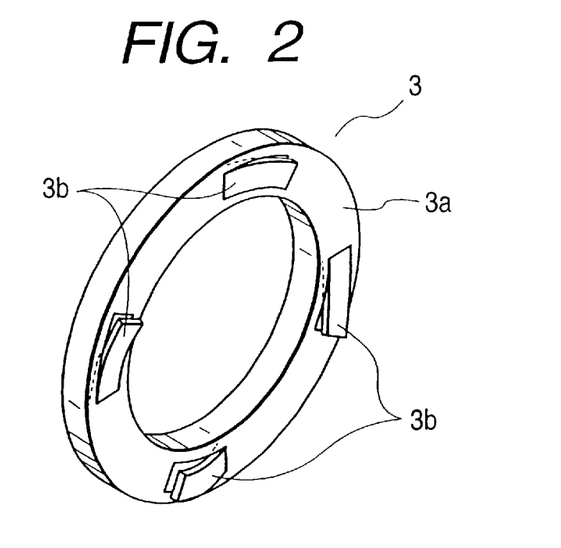
FIG. 2 is an enlarged, perspective view of an urging member in FIG. 1.
Figure 3:
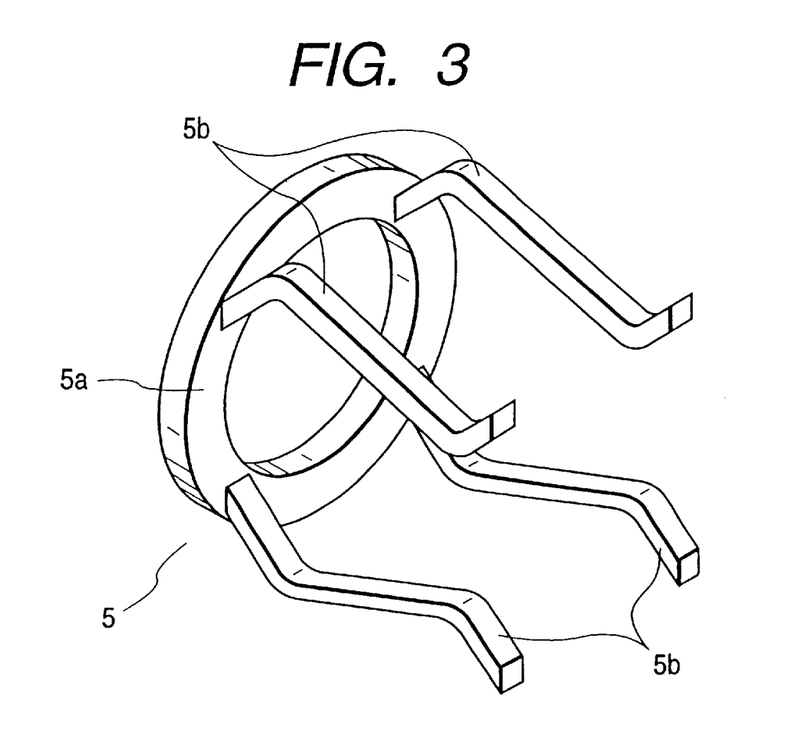
FIG. 3 is an enlarged, perspective view showing a modified form of the urging member in FIG. 1.

One preferred embodiment of the present invention will now be described with reference to the drawings. FIG. 1 is an exploded, perspective view showing one preferred embodiment of an optical connector of the invention. FIG. 2 is an enlarged, perspective view of an urging member in FIG. 1. FIG. 3 is an enlarged, perspective view showing a modified form of the urging member in FIG. 1.

Those portions, basically identical to those of the construction, will be designated by identical reference numerals, respectively, and detailed explanation thereof will be omitted.

In FIG. 1, reference numeral 1 denotes the optical connector, and this optical connector 1 comprises a pair of optical connector plugs 2 and 2, a ferrule holder 122 similar to that of the conventional construction, and a connector housing 123 similar to that of the conventional construction. The optical connector 1 is adapted to be fitted in a mating connector 124 (see FIG. 4).

Each of the optical connector plugs 2 and 2 comprises a photoconductive member (optical fiber) 105, and a ferrule 4 of a synthetic resin having the urging member 3 integrally molded therein. An inner sheath 105c and a conductor portion 105d of the photoconductive member 105 is adapted to be inserted and received in the ferrule 4.

Each of the ferrules 4 and 4 has a cylindrical smaller-diameter portion 4a and a cylindrical larger-diameter portion 4b. An annular engagement projection 4c is formed on the larger-diameter portion 4b, and the urging member 3 is insert molded in the larger-diameter portion 4b. A bonding surface 4d is formed at an insertion-side end of the larger-diameter portion 4b for the photoconductive member 105, and a step portion between an outer sheath 105b and the inner sheath 105c is abutted against and adhesively bonded to the bonding surface 4d.

The urging member 3 is made of metal, and as shown in FIG. 2, this urging member 3 has a ring-shaped base portion 3a, and resilient, contractible legs 3b (In this embodiment, the number of the legs is four, but is not limited to four, and a suitable number of legs can be formed.) are formed on the base portion 3a.

Each of the legs 3b is formed by stamping (pressing) into a leaf spring slanting and increasing in height progressively in a direction of the circumference of the ferrule 4. Thus, the legs 3b, though simple in construction, can provide a sufficient urging force generally equal to that of the conventional compression coil spring 109 (see FIG. 4).

The assembling of the optical connector 1 of the above construction will now be described with reference to FIG. 1.

First, an end portion of each of the photoconductive members 105 and 105 is inserted into the associated ferrule 4 having the urging member 3 integrally molded therein, and the bonding surface 4d and the above-mentioned step portion are bonded and fixed together by an adhesive, thereby forming the optical connector plug 2.

At this time, the photoconductive member 105 can be inserted into the ferrule 4 while firmly holding the photoconductive member 105 with the hand since the urging member 3 is integrally molded in the ferrule 4, and therefore the assembling of the optical connector plugs 2 and 2 can always be effected in a stable condition.

Figure 7:
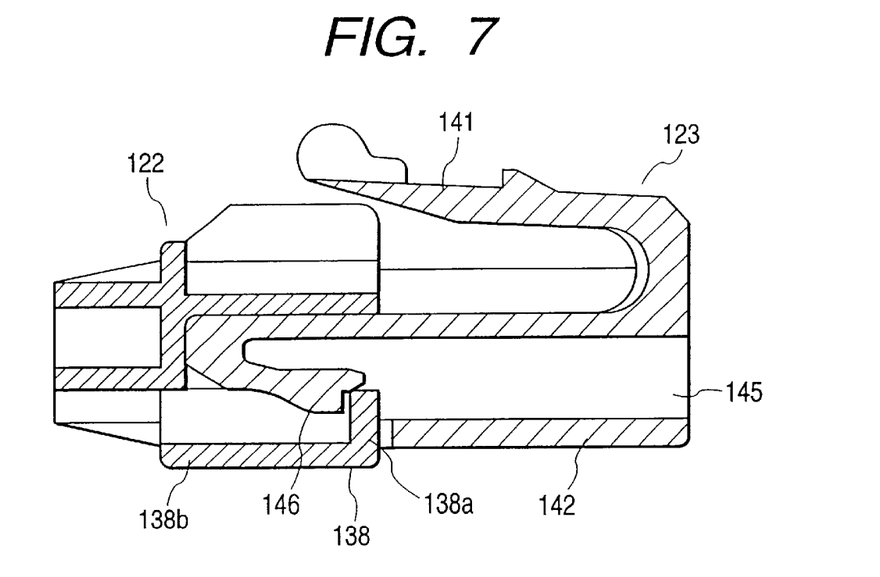
FIG. 7 is a cross-sectional view showing a condition in which the connector housing and a ferrule holder in FIG. 4 are fitted together.

Then, the optical connector plugs 2 and 2 are introduced respectively into plug receiving chambers 128 and 128 (only one of which is shown) of the ferrule holder 122 through plug-introducing slits 133 and 133 (only one of which is shown), and as the ferrule holder 122 is fitted on the connector housing 123, elongate guide projections 131 and 131 are brought into sliding engagement with guide grooves 151 and 151, respectively. Then, an elastic retaining piece portion 146 (see FIG. 7) is brought into engagement with one wall 138a (see FIG. 7) of a retaining portion 138 (see FIG. 7), so that the connector housing 123 and the ferrule holder 122 are fitted together, thus completing the assembling of the optical connector 1 (see FIGS. 8 and 9 with respect to this completely-assembled condition).

Each of the optical connector plugs 2 and 2, inserted in the associated plug receiving chamber 139 of the connector housing 123, has a play because of the resilient force of the legs 3b as is the case with the conventional coil spring 109 (see FIG. 4).

In this embodiment, there are provided the plug-introducing slits 133 and 133, and therefore one of the legs 3b of each optical connector plug 2 is disposed in the associated plug-introducing slit 133. However, the other three legs 3b can serve the intended purpose satisfactorily, and if there is any fear for the stability, this can be easily dealt with by increasing the number of the legs 3, and therefore there is no problem.

The optical connector plug 2 is thus assembled in a manner described above with reference to FIG. 1, and by doing so, the use of the compression coil spring 109 (see FIG. 4) in the conventional optical connector 102 (see FIG. 4) can be omitted, and therefore an error in the mounting of the compression coil spring 109 (see FIG. 4) will not occur. And, naturally, there is no need to confirm the mounting of the compression coil spring 109.

With the above construction, the process of assembling the optical connector plug 2 is simplified, and therefore the assembling operation is easy, and the efficiency of the operation is enhanced.

And besides, the number of the component parts, used in the above assembling process, is reduced by an amount corresponding to the number of the compression coil springs 109, and therefore the management of the stored component parts is easy.

When the urging member 3 is disposed at the above-mentioned position, the end portion of the ferrule 4 is disposed outside the range of expansion and contraction of the legs 3b, and even if the adhesive is squeezed out when the photoconductive member 105 is inserted into the ferrule 4, no correcting operation is needed in so far as the amount of this squeezed-out adhesive is unduly large.

Therefore, there can be provided the optical connector in which the assembling operation is easy, and the efficiency of the operation is markedly enhanced, and the measures are taken against assembling errors.

Modified Embodiment

Next, a modified form of the urging member 3 in FIG. 1 will be described with reference to FIG. 3.

Like the above-mentioned urging member 3, an urging member 5 of FIG. 3 has a ring-shaped base portion 5a, and resilient, contractible legs 5b (In this embodiment, the number of the legs is four, but is not limited to four, and a suitable number of legs can be formed.) are formed on the base portion 5a. Each of the legs 5a is in the form of a wavy bar having a plurality of bent portions, and the apexes of these bent portions face alternately in generally opposite directions.

This urging member 5 also achieves similar effects as described above for the urging member 3 (see FIGS. 1 and 2).

Various modifications can, of course, be made without changing the subject matter of the present invention.

As described above, in the present invention, the optical connector includes the optical connector plug, the connector housing, and the ferrule holder, and the urging member, having the resilient, contractible legs, is formed integrally on the ferrule of the optical connector plug. The connector housing has the receiving chamber for receiving the ferrule, and is adapted to be fitted in the housing of the mating connector. The ferrule holder receives the optical connector plug, and is fitted on the connector housing, and the legs abut against the ferrule holder to maintain an urged condition of the optical connector plug within the receiving chamber.

With this construction of the optical connector, the use of the compression coil spring in the conventional optical connector can be omitted, and therefore an error in the mounting of this compression coil spring will not occur, and there is no need to confirm the mounting of the compression coil spring. And besides, the process of assembling the optical connector plug is simplified, and therefore the assembling operation is easy, and the efficiency of the operation is enhanced. Furthermore, the photoconductive member can be inserted into the ferrule while firmly holding the photoconductive member with the hand.

Therefore, advantageously, there can be provided the optical connector in which the assembling operation is easy, and the efficiency of the operation is markedly enhanced, and the measures are taken against assembling errors.

In the present invention, each of the legs is in the form of a leaf spring slanting and increasing in height progressively in the direction of the periphery of the ferrule.

Therefore, there is achieved an advantage that the legs, though simple in construction, can provide a sufficient urging force generally equal to that of the conventional compression coil spring.

In the present invention, each of the legs is in the form of a wavy bar having a plurality of bent portions, and apexes of the bent portions face alternately in generally opposite directions.

In this case, also, there is achieved an advantage that the legs, though simple in construction, can provide a sufficient urging force generally equal to that of the conventional compression coil spring.

In the invention of the present invention, the urging member is formed at the end of the ferrule.

When the urging member is disposed at the above-mentioned position, the end portion of the ferrule is disposed outside the range of expansion and contraction of the legs, and even if the adhesive is squeezed out when the photoconductive member is inserted into the ferrule, no correcting operation is needed in so far as the amount of this squeezed-out adhesive is unduly large.

Therefore, this further reduces the time and labor required for the operation, and the efficiency of the operation can be further enhanced.

What is claimed is:

1. An optical connector comprising:
    an optical connector plug including:
        a photoconductive member;
        a ferrule receiving and retaining an end portion of said photoconductive member therein;
        an urging member, having resilient, contractible legs, being formed integrally on said ferrule;
    a connector housing for fitting connection to a housing of a mating connector, said connector housing having a receiving chamber for receiving said ferrule; and
    a ferrule holder receiving said optical connector plug, and being fitted on said connector housing, said legs abutting against said ferrule holder to maintain an urged condition of said optical connector plug within said receiving chamber.

2. An optical connector according to claim 1, in which each of said legs is in the form of a leaf spring slanting and increasing in height progressively in a direction of a periphery of said ferrule.

3. An optical connector according to claim 1, in which each of said legs is in the form of a wavy bar having a plurality of bent portions, and apexes of said bent portions face alternately in generally opposite directions.

4. An optical connector according to claim 1, in which said urging member is formed at an end of said ferrule.

5. An optical connector according to claim 2, in which said urging member is formed at an end of said ferrule.

6. An optical connector according to claim 3, in which said urging member is formed at an end of said ferrule.

* * * * *